(12) United States Patent (10) Patent No.: US 8,707,196 B2
Bekelman (45) Date of Patent: Apr. 22, 2014

(54) DYNAMIC, SET DRIVEN, RIBBON, SUPPORTING DEEP MERGE

(75) Inventor: Igor A. Bekelman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 12/893,540

(22) Filed: Sep. 29, 2010

(65) Prior Publication Data

US 2012/0079413 A1 Mar. 29, 2012

(51) Int. Cl.
*G06F 3/048* (2013.01)

(52) U.S. Cl.
USPC ........................................................ 715/777

(58) Field of Classification Search
USPC ........................................................ 715/777
See application file for complete search history.

(56) References Cited

U.S. PATENT DOCUMENTS

| | | | |
|---|---|---|---|
| 2004/0019848 | A1 | 1/2004 | Nguyen et al. |
| 2007/0055943 | A1 | 3/2007 | McCormack et al. |
| 2008/0244443 | A1 | 10/2008 | Schaw et al. |

OTHER PUBLICATIONS

Author Unknown, "What's New in v2007 vol. 3," Retrieved Aug. 4, 2010, http://documentation.devexpress.com/#GeneralInformation/CustomDocument3425.
Author Unknown, "WPF C# Ribbon Control Library," http://www.codeproject.com/KB/WPF/ribboncontrol.aspx.
Author Unknown, "The Ribbon and the Toolbar: Making the Most of the Merge User Interface on Different Versions of Windows," http://www.araxis.com/merge/merge-ribbon-interface.html.
Author Unknown, "Walkthrough: Creating a Custom Tab by Using the Ribbon Designer," Retrieved Aug. 4, 2010, http://msdn.microsoft.com/en-us/library/bb386104.aspx.
Author Unknown, "Delphi Menu Merging Problem," Retrieved Aug. 4, 2010, http://stackoverflow.com/questions/356379/delphi-menu-meming-problem.

*Primary Examiner* — Omar Abdul-Ali
*Assistant Examiner* — Phuong Nguyen
(74) *Attorney, Agent, or Firm* — Nicholas Chen; David Andrews; Micky Minhas

(57) ABSTRACT

Displaying a ribbon user interface in a context dependant fashion. A method includes displaying a ribbon user interface. The ribbon user interface is associated with some set of user data and includes one or more displayed tabs. Each tab includes one or more groups that are displayed for a given tab. Each group includes one or more controls. Displaying a ribbon user interface includes displaying a single set of groups, and one or more sets of controls, one for each group, for a single tab that is selected. The method further includes receiving user input related to the user data resulting in a change of context related to the user data. Membership of at least one of the single set of groups or the one or more sets of controls is changed based on the change of context related to the user data.

21 Claims, 5 Drawing Sheets

DYNAMIC, SET DRIVEN, RIBBON, SUPPORTING DEEP MERGE

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc for allowing a user to input data into the computer. In addition, various software user interfaces may be available.

Examples of software user interfaces include graphical user interfaces, text command line based user interface, function key or hot key user interfaces, and the like. Graphical user interfaces allow a user to interact with images on a screen. This can be done with pointing devices such as mice, track-balls, touch-screens, etc. Graphical user interfaces may be organized in a fashion that allows for consistent and logical interaction. For example, a graphical user interface may include a menu bar placed at the top of the graphical user interface. Tasks associated with file functionality (such as open, close, save, new, etc) may be grouped under a file heading. Tasks associated with edit functionality (such as select, copy, paste, cut, delete, etc.) may be grouped under an edit heading. Thus, functionality can be grouped together. Using a menu bar, a user may select a heading which will cause a drop down to show choices under that heading. The user can then select a choice. The menu bars are typically implemented using a minimalist approach using mainly textual labels. If graphic images are shown, they are generally simplified and minimal.

One somewhat recent graphical user interface artifact includes the concept of a ribbon. A ribbon is similar to a menu bar, but with a richer and more comprehensive interface. A ribbon includes toolbars placed on tabs in a tab bar. A user selects a tab to reveal the associated toolbar. The toolbars may include icon based controls.

Known ribbon control API's are mostly static. Additionally, while ribbons are generally a contextual interface exposing functionality depending on the context that the user is working in, ribbon controls are generally only contextual on tab-tabgroup levels.

Ribbon interfaces work well with a predefined set of objects, but may be less useful in the case of dynamic sets, such as for example a database objects hierarchy.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrates a method that may be practiced in a computing environment. The method includes acts for displaying a ribbon user interface in a context dependant fashion. The method includes displaying a ribbon user interface. The ribbon user interface is associated with some set of user data. The ribbon user interface includes one or more displayed tabs. Each tab includes one or more groups that are displayed for a given tab when the given tab is selected. Each group includes one or more controls. A control includes a user interface element selectable by a user and that when selected by the user causes some operation to be performed with respect to the user data. Displaying a ribbon user interface includes displaying a single set of groups, and one or more sets of controls, one for each group, for a single tab that is selected. The method further includes receiving user input related to the user data resulting in a change of context related to the user data. Membership of at least one of the single set of groups or the one or more sets of controls is changed based on the change of context related to the user data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein provide a declarative way to describe ribbon runtimes. Embodiments may include the ability to have unlimited stack of ribbon-aware objects. Embodiments may include the ability to add custom controls to ribbon. Embodiments may include the ability to perform deep merge of ribbon definitions, exposing contextual functionality at virtually any level of ribbon hierarchy.

Embodiments may associate a ribbon user interface with stack of selected objects defining context. Each object of context is associated with a ribbon definition. For example, the ribbon definitions may define ribbon elements associated with a context. The ribbon definition may be defined using a declarative definition. As shown herein various types of ribbon definitions are discussed. As noted previously, context specific ribbon definitions will be illustrated herein. Also illustrated are default ribbon definitions. The default ribbon is a ribbon that would be displayed if no context were taken into account. In some embodiments, the ribbon definitions define a ribbon delta. In particular, the ribbon definitions may define differences between a default ribbon and a context specific ribbon. The ribbon definitions may define ribbon elements that are added or removed from the default ribbon. In other embodiments, ribbon definitions may define ribbon elements that are present for a particular context. Thus, in some examples of this embodiment, the default ribbon definition may share common elements with the context specific ribbon definition.

Figure 1:
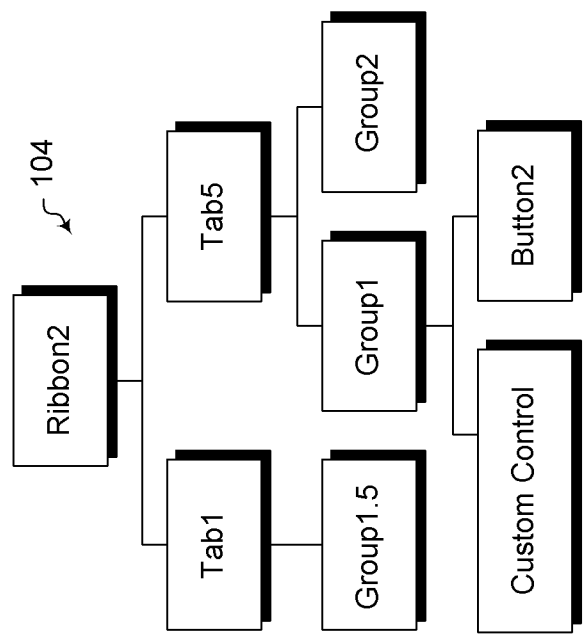
FIG. 1 illustrates a hierarchical representation of merging two ribbon interfaces into a single ribbon interface
Figure 1:
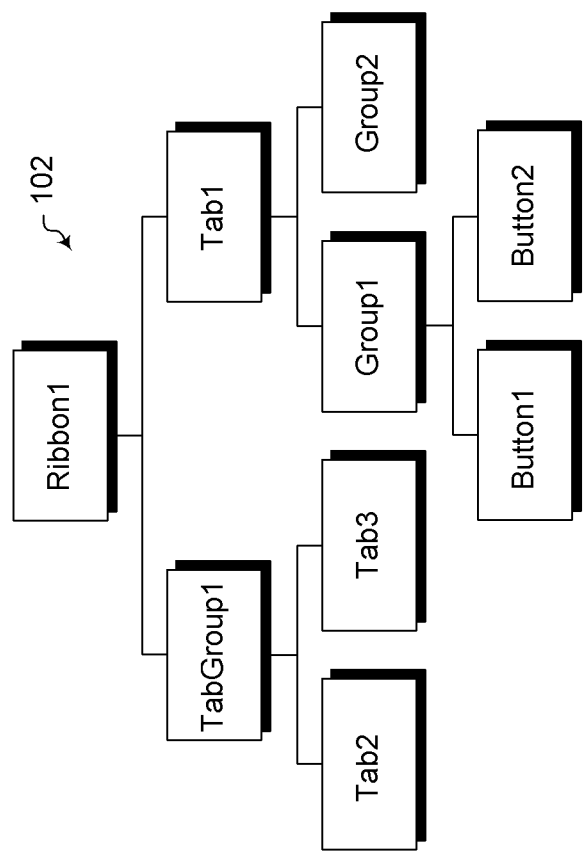
Figure 1:
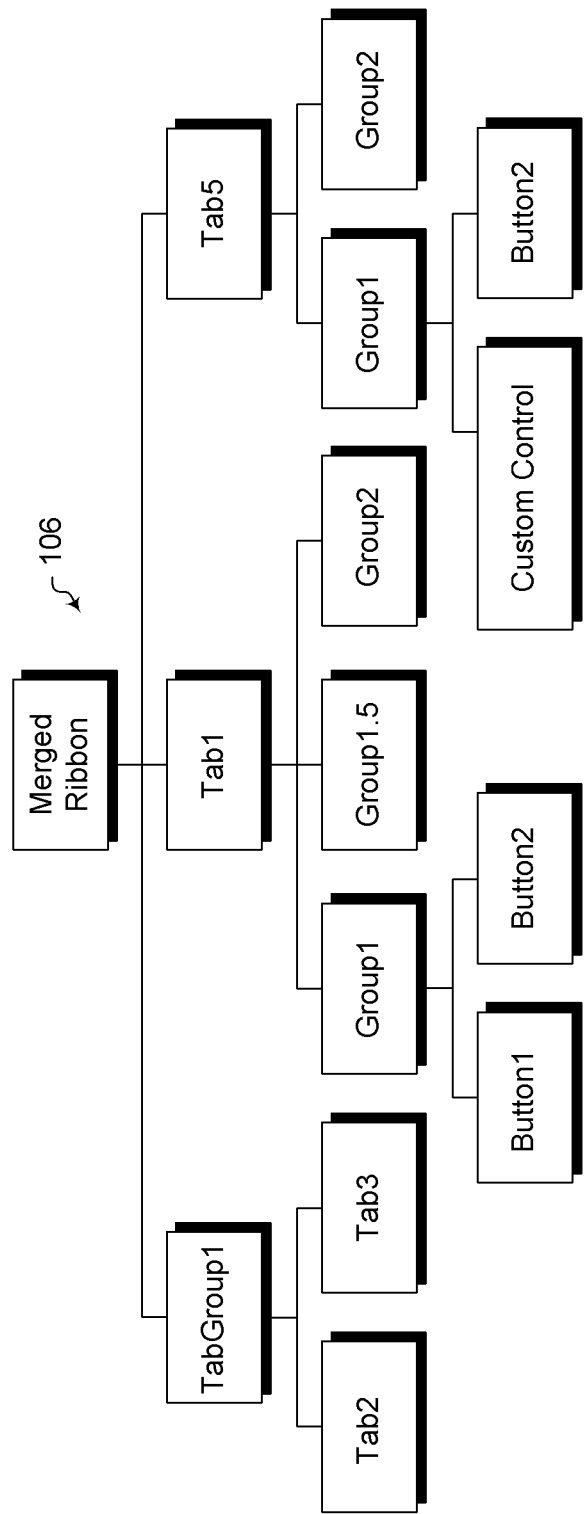

Embodiments may include a software module that implements a ribbon manager. The ribbon manager includes functionality for merging ribbon definitions. For example, a context specific ribbon definition could be merged with the default ribbon definition. For example, with reference to FIG. 1, a default ribbon definition 102 and context specific ribbon definition 104 are shown. The definitions are shown in a hierarchical fashion illustrating ribbons, tab groups, tabs, groups, buttons and custom controls. FIG. 1 further illustrates a merged ribbon definition 106. The merged ribbon definition 106 includes each of the elements from the default ribbon definition 102 and the context specific ribbon definition 104. Merging ribbon definitions facilitates keeping association of context objects with corresponding ribbon definition elements.

In some embodiments, the merge process is based on ribbon definition element IDs and goes through all levels of merged hierarchical ribbon definitions. For example, as illustrated in FIG. 1, merging takes place at various levels, including, in the example shown, at the tab level, at the group level and at the button and custom control level. For example, FIG. 1 illustrates that for the default ribbon definition 102 Tab1 has Group1 and Group2 below it. The context specific ribbon definition has Group 1.5 below Tab1. The merge process results in a merged ribbon definition 106 where Tab1 has Group1, Group1.5 and Group2 below it.

Embodiments may further include functionality for highlighting ribbon elements. For example, the declarative definition of a context specific ribbon may include an indication that a ribbon element should have highlighting. Such highlighting may include specialized fonts such as bold or italics, coloring of graphical icons or their background, animations, etc.

Using declarative ribbon definition formats further facilitates specifying various ribbon elements with appropriate parameters, such as labels, icons, tooltips or other custom controls.

Figure 2A:
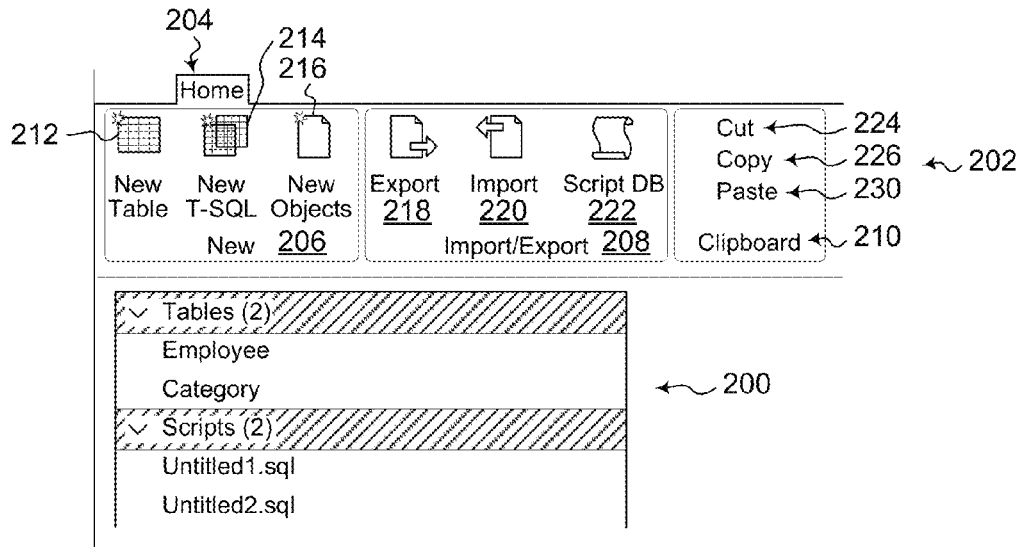
FIG. 2A illustrates a graphical representation of a ribbon user interface.
Figure 2B:
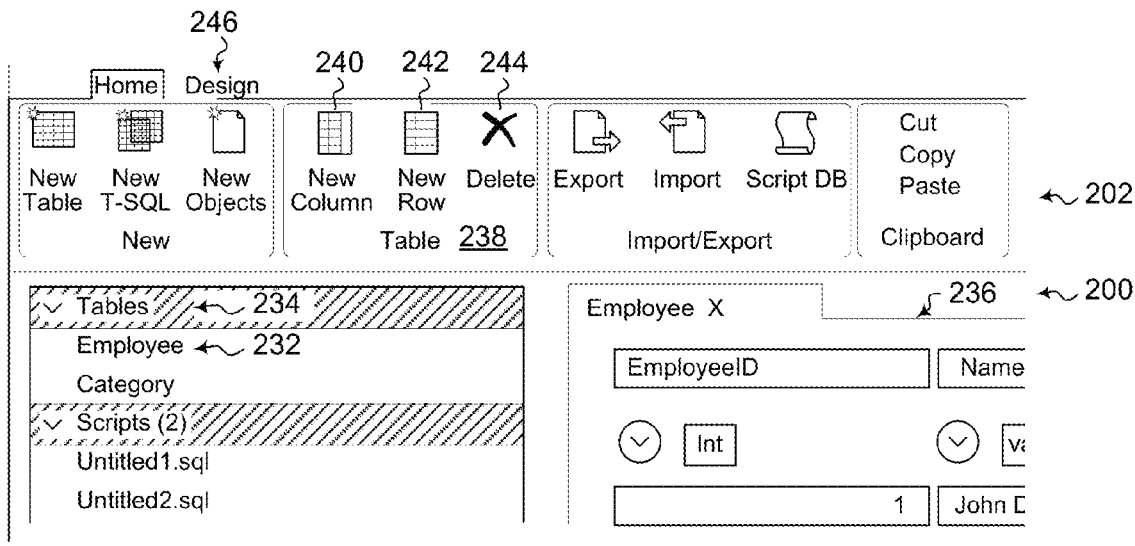
FIG. 2B illustrates a graphical representation of a ribbon user interface.
Figure 2C:
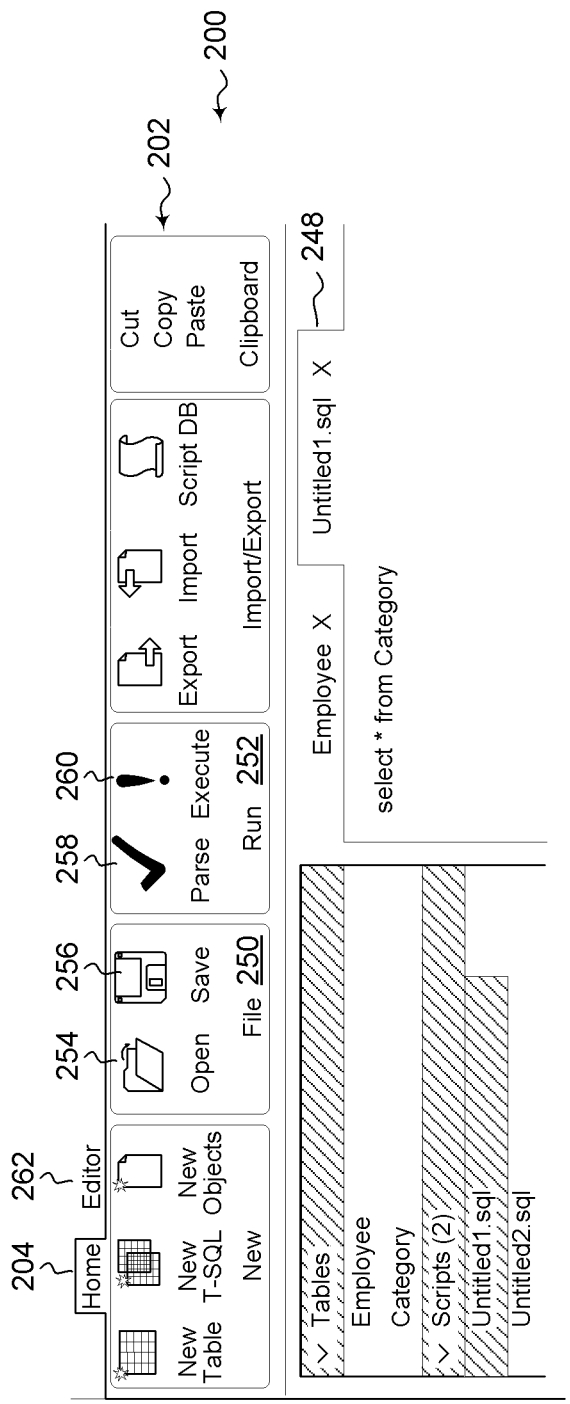
FIG. 2C illustrates a graphical representation of a ribbon user interface.

Referring now to FIGS. 2A, 2B, and 2C, examples of displayed graphical representations of ribbons are shown with modifications made due to context. FIG. 2 illustrates user interface 200 including a ribbon interface 202. The ribbon interface 202 includes a home tab 204. Within the home tab are three groups: New 206, Import/Export 208, and Clipboard 210. Within the New group 206, are three buttons: new table 212, New T-SQL 214, and New Objects 216. Within the Import/Export group 208 are three buttons: Export 218, Import 220, and Script DB 222. Within the Clipboard group 210 are three buttons: Cut 224, Copy 226 and Paste 230. The ribbon interface 202 is shown in a state where context is not taken into account. Rather, the ribbon interface 202 is shown in a state as defined by a default ribbon definition. While there may be some context associated with user data in the user interface 200, there may be no context specific ribbon definition for the particular context, and thus the ribbon interface 202 is displayed as defined by a default ribbon definition.

FIG. 2B illustrates a case where a user interacting with the user interface 200 selects the "Employee" entry 232 below a "Tables" category 234. Thus, the context associated with user data for the user interface 200 shown in FIG. 2B is the selection of a specific table by a user. This context causes a data editing window 236 to be displayed allowing a user to edit data in the "Employee" table. Further, this context causes a number of changes to the ribbon interface 202. Notably, in the particular example, a number of the changes facilitate editing in the data editing window 236.

For example, FIG. 2B illustrates that a new group, i.e. Table group 238 is merged into the Home tab 204 of the ribbon interface 202. The Table group 238 includes three buttons, namely: New Column 240, New Row 242 and Delete 244. These three buttons may be useful in editing and modifying tables. FIG. 2B further illustrates that this context causes a Design tab 246 to be added to the ribbon interface 202. While not illustrated here, the Design tab 246 may include a number of groups and buttons. These changes may be facilitated by merging a default ribbon definition with a context specific definition, where the context relates to selection of a table. The context specific definition includes definitions for the Table group 238, the New Column button 240, the New Row button 242, the Delete button 244 and the Design tab 246 along with definitions of groups, buttons and custom controls below the Design tab 246.

Referring now to FIG. 2C, another context specific example is shown where the context relates to selection of a script. FIG. 2C illustrates that a script "Untitled1.sql" is selected. Thus, the context associated with user data for the user interface 200 shown in FIG. 2C is the selection of a specific script by a user. This context causes a scriptediting window 248 to be displayed allowing a user to edit the "Untitled1.sql" script. Further, this context causes a number of changes to the ribbon interface 202. Notably, in the particular example, a number of the changes facilitate editing the script in the script editing window 248.

For example, FIG. 2C illustrates that two new groups, i.e. File group 250 and Run group 252 are merged into the Home tab 204 of the ribbon interface 202. The File group 250 includes two buttons, namely: Open 254 and Save 256. The Run group 252 includes two buttons, namely Parse 258 and Execute 260. These groups and buttons may be useful in running scripts. FIG. 2C further illustrates that this context causes an Editor tab 262 to be added to the ribbon interface 202. While not illustrated here, the Editor tab 262 may include a number of groups and buttons. These changes may be facilitated by merging a default ribbon definition with a context specific definition, where the context relates to selection of a script. The context specific definition includes definitions for the File group 250, the Open button 254, the Save button 256, the Run group 252, the Parse button 258, the Execute button 260 and the Editor tab 262, along with definitions of groups, buttons and custom controls below the Editor tab 262.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
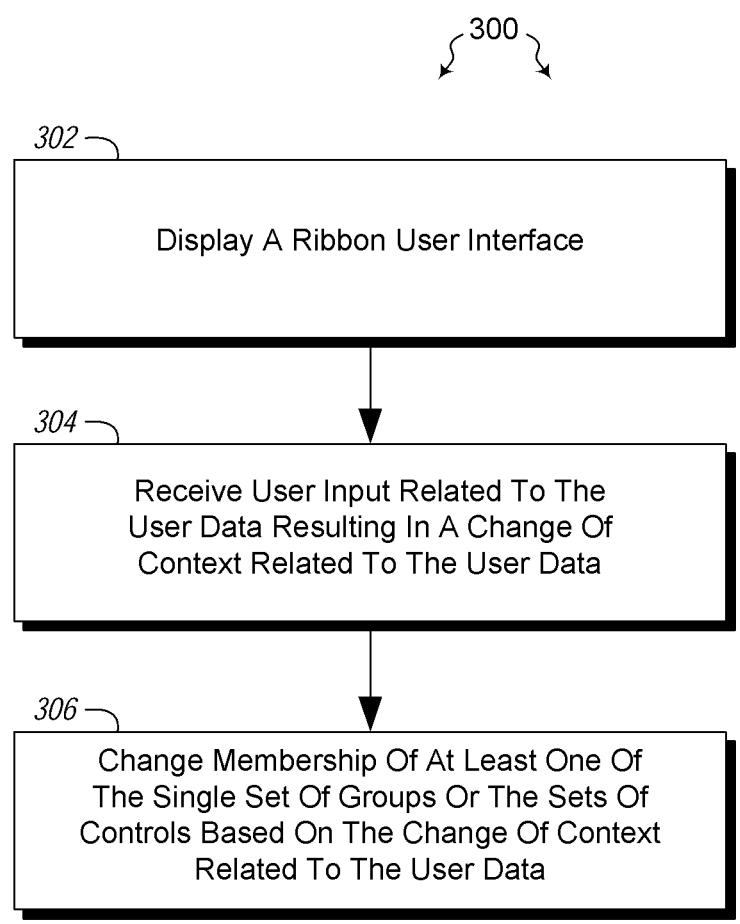
FIG. 3 illustrates a method of displaying a ribbon user interface in a context dependant fashion.

Referring now to FIG. 3, a method 300 is illustrated. The method 300 may be practiced in a computing environment and includes acts for displaying a ribbon user interface in a context dependant fashion. The method 300 includes displaying a ribbon user interface (act 302). The ribbon user interface is associated with some set of user data. For example, as illustrated in FIG. 2A, the ribbon interface 202 is associated with specific data related to various tables and scripts, such as the Employee and Category Tables and the Untitled1.sql and Untitled2.sql scripts. The ribbon user interface includes one or more displayed tabs, such as the Home tab 204 illustrated in FIG. 2B. Each tab includes one or more groups that are displayed for a given tab when the given tab is selected. For example, in FIG. 2B, the Home Tab 204 includes the New group 206, the Import/Export group 208 and the Clipboard group 210. Each group includes one or more controls. For example, the New group 206 includes a New Table button 212, a New T-SQL button 214 and a New Objects button 216. A control includes a user interface element selectable by a user. When the user interface element is selected by a user, some operation is performed with respect to the user data. Displaying a ribbon user interface includes displaying a single set of groups (e.g. the set including New, Import/Export and Clipboard in FIG. 2B), and one or more sets of controls, one for each group, for a single tab that is selected. For example, New Table button 212, New T-SQL button 214 and New Objects button 216 is a set of controls in the New group 206 of the Home tab 204.

The method 300 further includes receiving user input related to the user data resulting in a change of context related to the user data (act 304). For example, as illustrated in FIG. 2B, a user selects focus for the Employee table. This changes the context for the user data represented in the user interface 200.

The method 300 further includes changing membership of at least one of the single set of groups or the sets of controls based on the change of context related to the user data. For example, in the example shown in FIG. 2B, a new group, Table group 238, is added to the set of groups.

The method 300 may be practiced where changing membership of at least one of the single set of groups or the sets of controls based on the change of context related to the user data includes adding one or more additional groups to the set of groups such that additional groups are displayed. As an example illustrated in FIG. 2B, the Table Group 238 is added to the set of groups. Similarly, an example in FIG. 2C illustrates the addition of File and Run groups 250 and 252.

Embodiments may include determining a preferred placement location for the one or more additional groups and displaying the one or more additional groups at the preferred placement location. In some embodiments, the preferred placement location is determined based on a ranking system. In particular, groups with higher ranking may be place in more conspicuous or more easily accessible locations.

The method 300 may be practiced where changing membership of at least one of the single set of groups or the sets of controls based on the change of context related to the user data includes removing one or more groups from the set of groups such that fewer groups are displayed. Thus, embodiments may remove groups rather than adding them based on a change of context. This may be facilitated by a number of different mechanisms. For example, if a ribbon interface had a certain appearance because of a certain context, and context were changed to a context that did not correspond to a context specific ribbon definition, then the elements in the context specific ribbon definition that did not overlap with a context neutral ribbon definition would be removed. Alternatively, a context specific ribbon definition may specify groups or controls to be removed, rather than specifying groups or controls to be added.

The method 300 may be practiced where changing membership of at least one of the single set of groups or the sets of controls based on the change of context related to the user data includes adding one or more additional controls to one or more of the sets of controls such that additional controls are displayed. For example, additional buttons or custom controls may be added to one or more groups that are displayed or added.

Embodiments may include functionality for highlighting one or more of the one or more additional controls or groups. For example, as illustrated in FIG. 2B, the Table group 238 has different shading associated with that group showing that it is a context specific group.

The method 300 may be practiced where changing membership of at least one of the single set of groups or the sets of controls based on the change of context related to the user data includes removing one or more controls from one or more of the sets of controls such that fewer controls are displayed. Similar to the example set forth above changes in context can result in the removal of controls. This may occur due to context specific ribbon definitions specifying their removal, or due to changing to a context where different or fewer controls are specified.

The method 300 may be practiced where changing membership of at least one of the single set of groups or the sets of controls based on the change of context related to the user data includes merging groups from different tabs into a single tab. FIG. 1 illustrates an example in Tab1 where groups from the context neutral definition 102 are merged with groups from the context specific definition 104.

The method 300 may be practiced where changing membership of at least one of the single set of groups or the sets of controls based on the change of context related to the user data includes displaying a nested group in one of the groups in the set of groups. Thus for example, a group may include additional groups hierarchically below the group.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware and/or software, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of displaying a ribbon user interface in a context dependent fashion, the method comprising:
    displaying a ribbon user interface, the ribbon user interface being associated with some set of user data, the ribbon user interface comprising one or more displayed tabs, each tab comprising one or more groups that are displayed for a given tab when the given tab is selected, each group comprising one or more controls, wherein a control comprises a user interface element selectable by a user and that when selected by the user causes some operation to be performed with respect to the user data, and wherein displaying the ribbon user interface comprises displaying a single set of groups, and one or more sets of controls, one for each group, for a single tab that is selected;
    receiving user input related to the user data resulting in a change of context related to the user data, the user input comprising a selection of a script; and
    changing membership of at least one of the single set of groups or the one or more sets of controls based on the change of context related to the user data by at least adding one or more of a file group or a run group to the ribbon user interface, the file group including an open control and a save control which are each selectably operable for opening and saving scripts, respectively, the run group including a parse control and an execute control which are each selectably operable for parsing and running the scripts, respectively.

2. The method of claim 1, wherein changing membership of at least one of the single set of groups or the one or more sets of controls based on the change of context related to the user data comprises adding one or more additional groups to the set of groups such that additional groups are displayed.

3. The method of claim 2, further comprising determining a preferred placement location for the one or more additional groups and displaying the one or more additional groups at the preferred placement location.

4. The method of claim 3, wherein the preferred placement location is determined based on a ranking system.

5. The method of claim 1, wherein changing membership of at least one of the single set of groups or the one or more sets of controls based on the change of context related to the user data comprises removing one or more groups from the set of groups such that fewer groups are displayed.

6. The method of claim 1, wherein changing membership of at least one of the single set of groups or the one or more sets of controls based on the change of context related to the user data comprises adding one or more additional controls to one or more of the one or more sets of controls such that additional controls are displayed.

7. The method of claim 6 further comprising highlighting one or more of the one or more additional controls.

8. The method of claim 1, wherein changing membership of at least one of the single set of groups or the one or more sets of controls based on the change of context related to the user data comprises removing one or more controls from one or more of the one or more sets of controls such that fewer controls are displayed.

9. The method of claim 1, wherein changing membership of at least one of the single set of groups or the one or more sets of controls based on the change of context related to the user data comprises merging groups from different tabs into a single tab.

10. The method of claim 1, wherein changing membership of at least one of the single set of groups or the one or more sets of controls based on the change of context related to the user data comprises displaying a nested group in one of the groups in the set of groups.

11. In a computing environment, a physical computer readable storage medium comprising computer executable instructions that when executed by one or more processors cause the following to be performed:

displaying a ribbon user interface, the ribbon user interface being associated with some set of user data, the ribbon user interface comprising one or more displayed tabs, each tab comprising one or more groups that are displayed for a given tab when the given tab is selected, each group comprising one or more controls, wherein a control comprises a user interface element selectable by a user and that when selected by the user causes some operation to be performed with respect to the user data, and wherein displaying the ribbon user interface comprises displaying a single set of groups, and one or more sets of controls, one for each group, for a single tab that is selected;

receiving user input related to the user data resulting in a change of context related to the user data, the user input comprising a selection of a script; and changing membership of at least one of the single set of groups or the one or more sets of controls based on the change of context related to the user data by at least adding one or more of a file group or a run group to the ribbon user interface, the file group including an open control and a save control which are each selectably operable for opening and saving scripts, respectively, the run group including a parse control and an execute control which are each selectably operable for parsing and running the scripts, respectively.

12. The computer readable medium of claim 11, wherein changing membership of at least one of the single set of groups or the one or more sets of controls based on the change of context related to the user data comprises adding one or more additional groups to the set of groups such that additional groups are displayed.

13. The computer readable medium of claim 12, further comprising determining a preferred placement location for the one or more additional groups and displaying the one or more additional groups at the preferred placement location.

14. The computer readable medium of claim 13, wherein the preferred placement location is determined based on a ranking system.

15. The computer readable medium of claim 11, wherein changing membership of at least one of the single set of groups or the one or more sets of controls based on the change of context related to the user data comprises removing one or more groups from the set of groups such that fewer groups are displayed.

16. The computer readable medium of claim 11, wherein changing membership of at least one of the single set of groups or the one or more sets of controls based on the change of context related to the user data comprises adding one or more additional controls to one or more of the one or more sets of controls such that additional controls are displayed.

17. The computer readable medium of claim 16 further comprising highlighting one or more of the one or more additional controls.

18. The computer readable medium of claim 11, wherein changing membership of at least one of the single set of groups or the one or more sets of controls based on the change of context related to the user data comprises removing one or more controls from one or more of the one or more sets of controls such that fewer controls are displayed.

19. The computer readable medium of 11, wherein changing membership of at least one of the single set of groups or the one or more sets of controls based on the change of context related to the user data comprises merging groups from different tabs into a single tab.

20. In a computing environment, a computing system, the computing system comprising:

one or more processors;

one or more computer readable media coupled to the one or more processors, wherein the one or more computer readable media comprise computer executable instructions for implementing computer modules;

a display module implemented by one or more of the processors executing instructions stored on the one or more computer readable media, the display module configured to display a ribbon user interface, the ribbon user interface being associated with some set of user data, the ribbon user interface comprising one or more displayed tabs, each tab comprising one or more groups that are displayed for a given tab when the given tab is selected, each group comprising one or more controls, wherein a control comprises a user interface element selectable by a user and that when selected by the user causes some operation to be performed with respect to the user data, and wherein displaying the ribbon user interface comprises displaying a single set of groups, and one or more sets of controls, one for each group, for a single tab that is selected;

a user input module implemented by one or more of the processors executing instructions stored on the one or more computer readable media, the user input module configured to receive user input related to the user data resulting in a change of context related to the user data, the user input comprising a selection of a script; and a ribbon manager module implemented by one or more of the processors executing instructions stored on the one or more computer readable media, the ribbon manager module configured to merge a default ribbon definition with a context specific ribbon definition based on the change of context related to the user data by at least adding one or more of a file group or a run group to the ribbon user interface, the file group including an open control and a save control which are each selectably operable for opening and saving scripts, respectively, the run group including a parse control and an execute control which are each selectably operable for parsing and running the scripts, respectively.

21. The computing system of claim 20, wherein the method further includes highlighting one or more ribbon element by changing at least one of a font, a coloring, a background, an icon or an animation of the one or more ribbon element in response to the change in context.

* * * * *